(12) United States Patent
Spieth et al.

(10) Patent No.: US 8,292,508 B2
(45) Date of Patent: Oct. 23, 2012

(54) INTEGRATED TWO-LEVEL BEARING

(75) Inventors: David Earl Spieth, Canton, MI (US); Kevin Lueschen, Fenton, MI (US); Michael Gregory Mshar, Brighton, MI (US); Mark A. Thorpe, Britton, MI (US)

(73) Assignee: NSK Corporation, Ann Arbor, MI (US)

( * ) Notice: Subject to any disclaimer, the term of this patent is extended or adjusted under 35 U.S.C. 154(b) by 520 days.

(21) Appl. No.: 12/354,212

(22) Filed: Jan. 15, 2009

(65) Prior Publication Data
US 2010/0178002 A1    Jul. 15, 2010

(51) Int. Cl.
| F01D 11/00 | (2006.01) |
| F01D 25/16 | (2006.01) |
| F03B 11/06 | (2006.01) |
| F16C 19/00 | (2006.01) |
| F16C 43/00 | (2006.01) |

(52) U.S. Cl. .......... 384/461; 415/11; 415/113; 415/229; 415/231; 384/537

(58) Field of Classification Search .................. 384/461, 384/537, 539; 415/111, 113, 229, 230, 231; 416/174; 123/41.44
See application file for complete search history.

(56) References Cited

U.S. PATENT DOCUMENTS

| 1,539,702 | A | * | 5/1925 | Szuba ............................ 384/461 |
| 4,768,923 | A | * | 9/1988 | Baker ............................ 415/230 |
| 4,955,786 | A | * | 9/1990 | Kunkel et al. .................. 415/110 |
| 4,983,101 | A | * | 1/1991 | Kunkel et al. .................. 417/362 |
| 5,234,270 | A | * | 8/1993 | Mathes .......................... 384/461 |
| 5,632,560 | A | * | 5/1997 | Dittenhofer ................... 384/447 |
| 5,639,166 | A | * | 6/1997 | Dittenhofer ................... 384/461 |
| 6,062,812 | A | * | 5/2000 | Ozawa ....................... 415/173.1 |
| 6,406,188 | B1 | | 6/2002 | Lin et al. |
| 6,742,933 | B2 | | 6/2004 | Murata |
| 6,866,476 | B2 | * | 3/2005 | Sakata et al. ............... 415/174.2 |
| 7,063,490 | B2 | | 6/2006 | Ricker |
| 2004/0076354 | A1 | | 4/2004 | Murata |
| 2006/0245677 | A1 | | 11/2006 | Kenworthy et al. |
| 2006/0288783 | A1 | | 12/2006 | Ricker et al. |
| 2007/0223853 | A1 | | 9/2007 | Diemer et al. |
| 2008/0232731 | A1 | | 9/2008 | Venter |

FOREIGN PATENT DOCUMENTS

EP    0 062 535 A1    10/1982

OTHER PUBLICATIONS

Form PCT/ISA/220 dated May 20, 2010 (One (1) page); Form PCT/ISA/237 dated May 20, 2010 (Six (6) pages); Form PCT/ISA/210 dated May 20, 2010 (Two (2) pages).

* cited by examiner

*Primary Examiner* — James Pilkington
*Assistant Examiner* — Adam D Rogers
(74) *Attorney, Agent, or Firm* — Crowell & Moring LLP

(57) ABSTRACT

A bearing arrangement includes a bearing outer element that defines a first plurality of races opening radially inwardly, a bearing inner element that defines a second plurality of races opening radially outwardly, and a bearing middle element defining a third plurality of races at its radially outer surface thereof and a fourth plurality of races at its radially inner surface thereof. Rolling elements are receivable in the races. The bearing middle element includes an axial protrusion at least at one end thereof that can be received in a housing with respect to which the bearing outer and inner elements are rotatable.

19 Claims, 2 Drawing Sheets

INTEGRATED TWO-LEVEL BEARING

BACKGROUND OF THE INVENTION

1. Field of the Invention

The automotive industry is increasingly focusing on reducing parasitic losses in power transmission systems to improve fuel economy. One way to achieve such a reduction is to transform each system powered by an engine belt so that it can be turned on and off as needed. This is often accomplished by multiple bearings and clutches. For example, in a water pump application, having an "off" setting is beneficial during initial operation of an engine to permit heating of the engine to a steady operational temperature more quickly so that the engine burns fuel more efficiently.

Packaging, thermal expansion, and assembly stack-up tolerances create issues for the design and manufacture of a clutched system in various applications. These issues are addressed by the present invention.

2. Description of Related Art

Bearings involved in clutched water pumps, which involve relatively new technology, are similar to bearings used in compressors, which involve mature technology. Typically, one bearing, or a set of bearings, is used to support a shaft that rotates an impeller blade in a water pump, while another bearing, or another set of bearings, is used to allow an engine pulley to rotate. A clutch system connects the shaft to the pulley, allowing them to rotate together. When the clutch is disengaged, the pulley bearing rotates along with the engine, but the shaft bearing of the water pump does not rotate.

Current bearing assemblies typically require multiple layers to work perfectly with each other for ideal function. The layers typically required for a clutched water pump include a pulley bearing outer ring, a rolling element layer, a pulley bearing inner ring, an aluminum pump housing, a shaft bearing outer ring, another rolling element layer, and a shaft. For other applications, there may also be a bearing inner ring between the innermost rolling elements and the shaft.

SUMMARY OF THE INVENTION

Certain issues are addressed by way of the present invention, which combines two sets of bearings into one layered set. As will be described, a bearing design according to the invention eliminates two layers, requiring only a bearing outer ring, a rolling element layer, a bearing middle ring, another rolling element layer, and a shaft.

In clutched water pump and compressor systems, concentricity control of pulley bearings relative to shaft bearings is a concern. In such a system, the clutch rotates about the axis created by the pulley and pulley bearing. When the clutch is active, the shaft in the water pump bearing will also be rotating, ideally on the same axis. If the two bearings are not concentric on the same axis, the shaft will be forced to tilt back and forth as it is rotated off-center by the clutch. Concentricity control is improved according to the invention, since, with the new design, the two bearings are combined, allowing for dimensional monitoring and adjustment at the time of bearing production. The bearing system is also built as one unit, and does not depend on press-fit connections with another material source, which are complicated by thermal effects.

Complying with design envelope constraints for the bearings is also a concern in water pump systems. It is less of an issue in compressor systems, since, in compressor systems, design envelope constraints on space and function generally allow the shaft to be placed between two small single-row bearings with no cantilever, and the compressor configuration typically allows the single-row bearings to be placed rearward of the pulley bearing so that there is no sandwiched layer of pump housing material. In a clutched water pump, an impeller blade is cantilevered from the shaft in the water pump bearing. Due to pump housing design and design envelope space, the water pump bearing has to fit inside the clutch pulley bearing inner diameter with enough extra space for a housing layer between the two bearings.

Design envelope constraint compliance for the bearing set is improved with the new design. Current technology requires a pump housing wall thickness of 6 millimeters or greater for aluminum housings. Elimination of the pump wall layer saves 6 millimeters per side for a total of at least 12 millimeters on the diameter. Combining the outer race of the shaft bearing and the inner race of the pulley bearing into one race results in further space efficiency, potentially reducing the packaging space another 3 millimeters or more. Combined space efficiencies can reduce total required packaging space by 15 millimeters or more.

Thermal expansion of the system is an additional concern. Typically, pump housings are made of aluminum to save vehicle weight. Aluminum expands at a different rate than steel as the pump water increases in temperature. This characteristic causes changes in the press or slip fits of the bearings to the aluminum housing and affects the bearing radial internal clearances of each bearing at different rates. Thermal expansion concerns are addressed by the new design. The expansion rate of aluminum relative to steel no longer affects the radial internal clearance of the bearing combination. Reducing this variance leads to more control over system life and location stability for clutch components, seals, and impellers. Each of these characteristics is affected by the bearing's internal clearance.

Analogous conventional bearings consist of two rings of metal forming inner and outer races. The rings are separated by rolling elements. By way of this invention, the need for two bearings, and a total of four rings, is eliminated; instead, one bearing, and a total of three rings, can be used. This allows for smaller packaging space and better manufacturing control of the manner in which the rolling elements act relative to each other. Better control of radial internal clearance, shaft tilt, and free rock can also be maintained. One application of this bearing would provide benefit to a clutch system by maintaining better angular control between a clutch plate and a pulley. By having the bearing elements self-contained in one package, negative effects of multiple interfaces and thermal expansion are also reduced.

Although the focus of this disclosure may appear to be on water pump applications, this technology can be used in any application requiring concentric bearings to provide inner and outer ring rotation and a stationary middle section. The invention is also applicable, for example, to pulleys, fans, and other elements involving engagement and disengagement functions.

In a particular configuration of the invention, a bearing arrangement includes a bearing outer element that defines a first plurality of races opening radially inwardly, a bearing inner element that defines a second plurality of races opening radially outwardly, and a bearing middle element defining a third plurality of races at its radially outer surface thereof and a fourth plurality of races at its radially inner surface thereof. Rolling elements are receivable in the races, and the bearing middle element includes an axial protrusion at least at one end thereof that can be received in a housing with respect to which the bearing outer and inner elements are rotatable.

The bearing outer and middle elements are rings in this configuration, while the bearing inner element is a shaft. The axial protrusion may have a flat surface defined thereon to prevent rotation of the bearing middle element relative to the housing. A press fit may be used to connect the axial protrusion within an opening of the housing, and the axial protrusion may also include a groove at a distal end thereof to receive a retaining ring that secures the axial protrusion within an opening of the housing. The third and fourth pluralities of races are offset relative to one another in an axial direction for compact construction, and the axial protrusion defines a circumferentially extending wall against which the housing is abuttable upon reception of the end of the axial protrusion in the housing.

A process of securing the bearing arrangement to the housing is also disclosed.

The resulting two-level bearing configuration thus has an outer race, a rolling element layer, a middle race, another rolling element layer, and an inner race, which may be formed by the shaft. The bearing levels or layers are separated by two rows of rolling elements. By holding the middle race or layer fixed in the housing, both the outer ring and the shaft are free to rotate independently of each other. The outer ring and the shaft can be made to run simultaneously when a clutch mechanism is applied between a hub pressed on the shaft and a pulley pressed on the outer ring. The design will also use grease, seals, and, optionally, two rubber O-rings, although these portions of the design are not considered new developments.

DETAILED DESCRIPTION OF THE INVENTION

Figure 1:
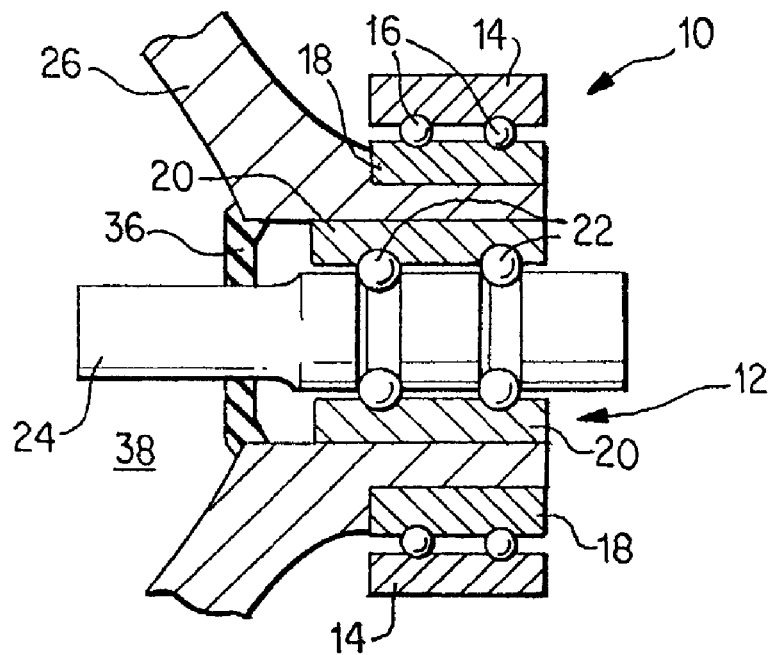
FIG. 1 is a view, partly in cross section, of a conventional bearing configuration.
Figure 3:
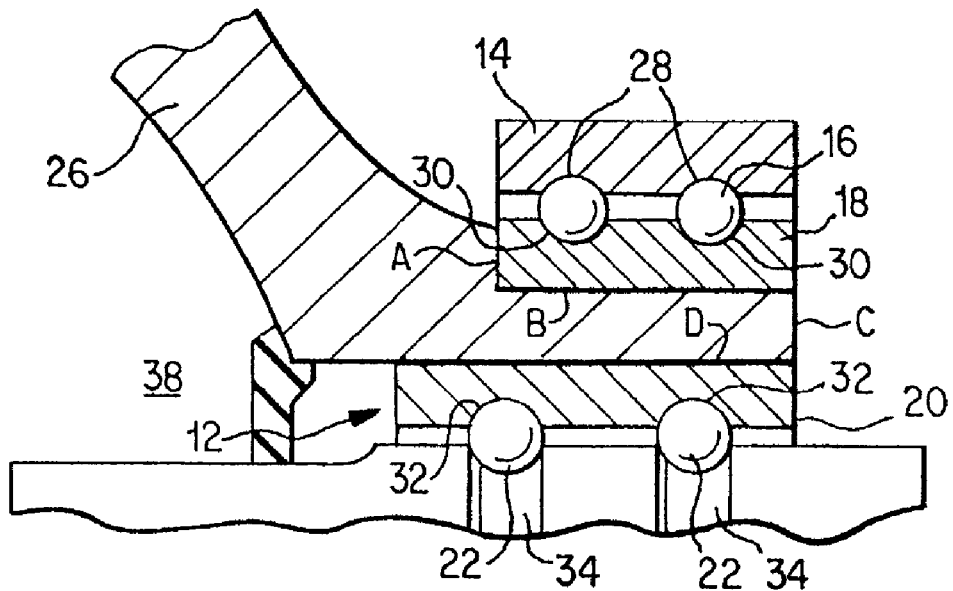
FIG. 3 is an enlarged view of a part of the conventional configuration of FIG. 1 with section lines omitted for clarity.

A description of the conventional bearing configuration shown in FIGS. 1 and 3 will first be provided in order to facilitate an understanding of the advantages provided by the invention.

The conventional bearing configuration illustrated in FIGS. 1 and 3 includes a first, outer bearing 10 and a second, inner bearing 12. The outer bearing 10, as illustrated, is composed of an outer bearing outer ring 14, rolling elements 16, and an outer bearing inner ring 18. The inner bearing 12, as illustrated, is composed of an inner bearing outer ring 20, rolling elements 22, and a central shaft 24. A pump housing 26, typically constructed of aluminum or other such material and partially illustrated in FIGS. 1 and 3, is interposed between the inner bearing outer ring 20 and the outer bearing inner ring 18 to support those rings.

As best seen in the enlarged view provided by FIG. 3, each of the rolling elements 16 travels within an outer bearing outer race 28 formed in the outer ring 14 and a corresponding outer bearing inner race 30 formed in the inner ring 18. Each of the rolling elements 22, similarly, travels within an inner bearing outer race 32 formed in the outer ring 20 and a corresponding inner bearing inner race 34 formed directly in the shaft 24. An appropriate retainer or separator (not shown) maintains the proper spacing between adjacent rolling elements 16 and 22 of each set of rolling elements.

An elastomeric seal 36 is typically interposed between the pump housing 26 and the central shaft 24 to maintain separation of the pump housing interior 38 and the inner bearing 12.

Figure 2:
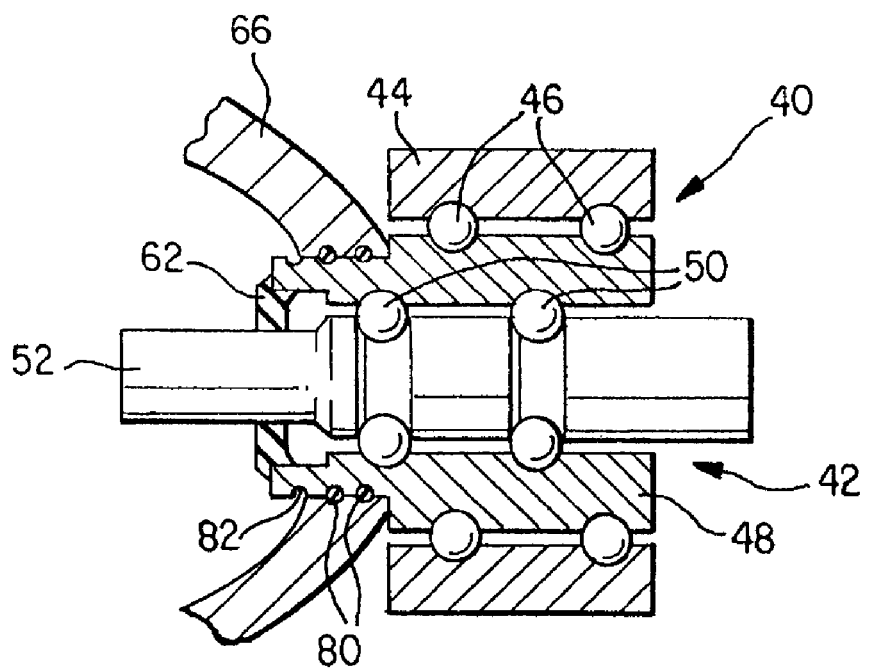
FIG. 2 is a view, similar to that of FIG. 1, showing a bearing configuration according to the invention.
Figure 4:
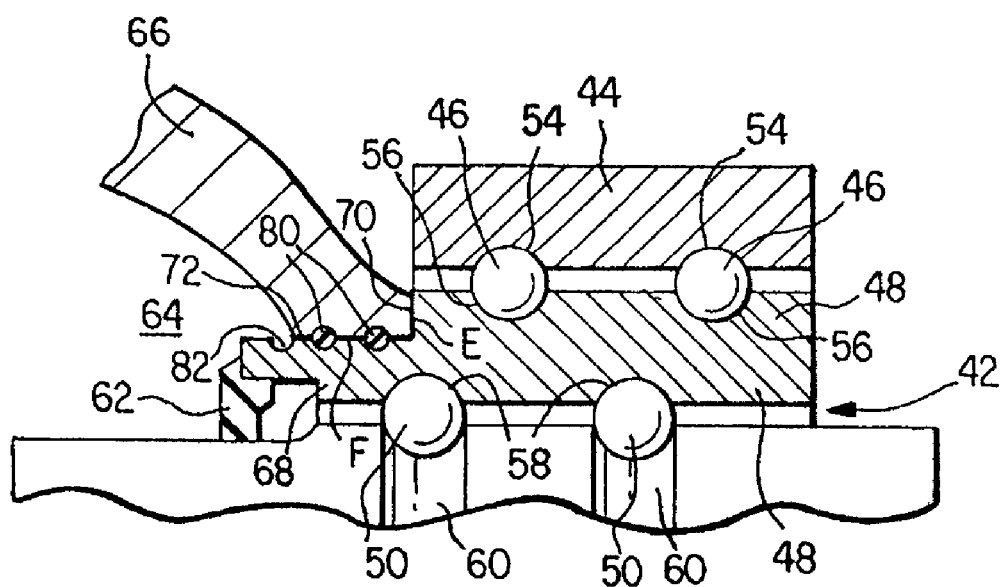
FIG. 4 is an enlarged view similar to that of FIG. 3 but of the bearing configuration shown in FIG. 2.

As shown in FIGS. 2 and 4, the bearing arrangement or configuration according to this invention includes a first, outer bearing 40 and a second, inner bearing 42. The outer bearing 40, as illustrated, is composed of a bearing outer ring 44, rolling elements 46, and a bearing middle ring 48. The inner bearing 42, as illustrated, is composed of the same bearing middle ring 48, rolling elements 50, and a central shaft 52. A pump housing 66, partially illustrated in FIGS. 2 and 4, is secured to the bearing middle ring 48 in a manner that will become apparent.

Each of the rolling elements 46 travels within an outer bearing outer race 54 formed in the bearing outer ring 44 and a corresponding outer bearing inner race 56 formed in the bearing middle ring 48. Each of the rolling elements 50, similarly, travels within an inner bearing outer race 58 formed in the bearing middle ring 48 and a corresponding inner bearing inner race 60 formed directly in the shaft 52. As with the conventional configuration discussed previously, an appropriate retainer or separator (not shown) maintains the proper spacing between adjacent rolling elements 46 and 50 of each set of rolling elements. In this arrangement, an elastomeric seal 62 is interposed between the bearing middle ring 48 and the central shaft 52 to maintain separation of the interior 64 of the pump housing 66 and the inner bearing 42. The races 58 and 58, and thus the sets of rolling elements running therein, can be staggered relative to the races 56 and 56 on the bearing middle ring 48 in order to minimize packaging space required. As an added feature, containing the outer bearing 40 and the inner bearing 42 as one unit allows a mechanical seal 62 to be placed on the bearing when it is constructed, thereby eliminating an assembly operation for the pump assembler.

The bearing middle ring 48 includes an axial protrusion 68 of reduced outer diameter. When the bearing assembly is in use, that axial protrusion 68 extends into the interior 64 of the pump housing 66. A circumferentially extending wall 70 is thus defined at the junction of the axial protrusion 68 and the remainder of the bearing middle ring 48, and a surface 72 of the protrusion 68 extends, in the direction of the interior of the pump housing 66, away from the circumferentially extending wall 70.

The shaft, bearing rings, and rolling elements of the illustrated bearing configuration are made of SUJ-2 high chromium tool steel or other such material with suitable hardness and wear resistance characteristics.

The bearing outer ring 44, rolling elements 46, bearing middle ring 48, rolling elements 50, and central shaft 52 can be assembled initially to form the two-level bearing. To secure the pump housing 66 and the bearing middle ring 48 together, the distal end of the bearing middle ring 48 is press-fit into and installed to the pump housing 66 by applying pressure to that bearing middle ring only. This assembly procedure prevents the ball rows from brinelling or deforming any of the races. The assembled bearing and pump housing unit prevents leakage of coolant from the interior 64 by way of (1) the frictional press fit connection between the outer diameter of the axial protrusion 68 and the inner diameter of a corresponding protrusion receiving opening in the pump housing 66, and (2) optionally using a seal, such as the two rubber o-rings 80 shown, between the outer surface of the axial protrusion 68 and the inner surface of the opening in the pump housing 66.

After connection of the two-level bearing to the pump housing 66, the housing 66 abuts against the wall 70 defined on the axial protrusion 68 for proper positioning. The distal end of the bearing middle ring 48 is retained in the pump housing 66 by (1) the frictional press fit connection between the outer diameter of the axial protrusion 68 and the inner diameter of a corresponding protrusion receiving opening in the pump housing 66, and (2) optionally providing an appropriately located groove 82 in the outer diameter of the axial protrusion 68 and utilization of a retaining ring (not shown) receivable in that groove 82. To prevent relative rotation of the bearing middle ring 48 and the pump housing 66, a portion of the bearing middle ring can have a "D-flat" (a "D" type cross section) instead of being round.

By way of the construction described, the pump housing manufacturer benefits by being provided with fewer areas of the housing casting that require machining. More particularly, referring again to FIG. 3, the bearing-receiving portion of a conventional pump housing 26 typically requires machining to produce surfaces A, B, C, and D. As is apparent by comparing FIGS. 3 and 4, however, a significant reduction in machining is permitted by way of the configuration shown in FIG. 4, since only surfaces E and F are needed with a construction according to the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A bearing arrangement comprising:
a bearing outer element that defines a first plurality of races opening radially inwardly;
a bearing inner element that defines a second plurality of races opening radially outwardly;
a bearing middle element defining a third plurality of races at a radially outer surface thereof and a fourth plurality of races at a radially inner surface thereof; and
sets of rolling elements receivable in said first, second, third, and fourth pluralities of races;
wherein said bearing middle element includes an axial protrusion of reduced outer diameter at least at one end thereof that surrounds the bearing inner element and is securable by press-fitting to a housing with respect to which the bearing outer and inner elements are rotatable and the bearing middle element is non-rotatably connected, and a circumferentially extending wall, at a junction of the axial protrusion and a remainder of the bearing middle element, abuttable with the housing for proper relative positioning of the bearing middle element and the housing.

2. The bearing arrangement according to claim 1, wherein said bearing outer element and said bearing middle element are rings.

3. The bearing arrangement according to claim 2, wherein the third and fourth pluralities of races are offset relative to one another in an axial direction of the bearing arrangement.

4. The bearing arrangement according to claim 2, wherein said bearing inner element is a shaft.

5. The bearing arrangement according to claim 4, wherein the third and fourth pluralities of races are offset relative to one another in an axial direction of the bearing arrangement.

6. The bearing arrangement according to claim 1, wherein said axial protrusion is connectable by a press fit connection in an opening of the housing.

7. The bearing arrangement according to claim 1, wherein said axial protrusion includes a groove at a distal end thereof to receive a snap ring that secures the axial protrusion within an opening of the housing.

8. The bearing arrangement according to claim 1, wherein the third and fourth pluralities of races are offset relative to one another in an axial direction of the bearing arrangement.

9. The bearing arrangement according to claim 1, wherein adjacent sets of said rolling elements that are receivable in said first and third pluralities of races have one set of said rolling elements receivable in said second and fourth pluralities of races disposed therebetween, and adjacent sets of said rolling elements that are receivable in said second and fourth pluralities of races have one set of said rolling elements receivable in said first and third pluralities of races disposed therebetween.

10. In combination, a bearing arrangement and a housing for a clutch, a water pump, or another device involving engagement and disengagement functions, comprising:
a bearing outer element, rotatable with respect to said housing, that defines a first plurality of races opening radially inwardly;
a bearing inner element, rotatable with respect to said housing, that defines a second plurality of races opening radially outwardly;
a bearing middle element non-rotatably connected to the housing and defining a third plurality of races at a radially outer surface thereof and a fourth plurality of races at a radially inner surface thereof; and
sets of rolling elements receivable in said first, second, third, and fourth pluralities of races;
wherein said bearing middle element includes an axial protrusion of reduced outer diameter at least at one end thereof that surrounds the bearing inner element and is securable by press-fitting to said housing, and a circumferentially extending wall, at a junction of the axial protrusion and a remainder of the bearing middle element, abuttable with the housing for proper relative positioning of the bearing middle element and the housing.

11. A bearing arrangement and housing combination according to claim 10, wherein said bearing outer element and said bearing middle element are rings.

12. A bearing arrangement and housing combination according to claim 11, wherein said bearing inner element is a shaft.

13. A bearing arrangement and housing combination according to claim 10, wherein said axial protrusion has a flat surface defined thereon to prevent rotation of said bearing middle element relative to said housing.

14. A bearing arrangement and housing combination according to claim 10, wherein said axial protrusion is connectable by a press fit connection in an opening of the housing.

15. A bearing arrangement and housing combination according to claim 10, wherein said axial protrusion includes a groove at a distal end thereof to receive a snap ring that secures the axial protrusion within an opening of the housing.

16. A bearing arrangement and housing combination according to claim 10, wherein the third and fourth pluralities of races are offset relative to one another in an axial direction of the bearing arrangement.

17. A bearing arrangement and housing combination according to claim 10, wherein adjacent sets of said rolling elements that are receivable in said first and third pluralities of races have one set of said rolling elements receivable in said second and fourth pluralities of races disposed therebetween, and adjacent sets of said rolling elements that are receivable in said second and fourth pluralities of races have one set of said rolling elements receivable in said first and third pluralities of races disposed therebetween.

18. A bearing arrangement comprising:
 a bearing outer element that defines a first plurality of races opening radially inwardly;
 a bearing inner element that defines a second plurality of races opening radially outwardly;
 a bearing middle element defining a third plurality of races at a radially outer surface thereof and a fourth plurality of races at a radially inner surface thereof; and
 sets of rolling elements receivable in said first, second, third, and fourth pluralities of races;
 wherein said bearing middle element includes an axial protrusion of reduced outer diameter at least at one end thereof that surrounds the bearing inner element and is securable by press-fitting to an element with respect to which the bearing outer and inner elements are rotatable and the bearing middle element is non-rotatably connected, and a circumferentially extending wall, at a junction of the axial protrusion and a remainder of the bearing middle element, abuttable with the element with respect to which the bearing outer and inner elements are rotatable and the bearing middle element is non-rotatably connected for proper relative positioning of the bearing middle element and the element with respect to which the bearing outer and inner elements are rotatable and the bearing middle element is non-rotatably connected.

19. The bearing arrangement according to claim 18, wherein adjacent sets of said rolling elements that are receivable in said first and third pluralities of races have one set of said rolling elements receivable in said second and fourth pluralities of races disposed therebetween, and adjacent sets of said rolling elements that are receivable in said second and fourth pluralities of races have one set of said rolling elements receivable in said first and third pluralities of races disposed therebetween.

\* \* \* \* \*